(12) United States Patent
Maamoun et al.

(10) Patent No.: US 11,770,203 B2
(45) Date of Patent: Sep. 26, 2023

(54) MATCHING TRANSMITTERS WITH RECEIVERS FOR MAKING NETWORK-LEVEL ASSIGNMENTS

(71) Applicant: Ciena Corporation, Hanover, MD (US)

(72) Inventors: Khaled Maamoun, Ottawa (CA); Ahmad Abdo, Ottawa (CA); Sadok Aouini, Gatineau (CA); Bilal Riaz, Stittsville (CA); Mahdi Parvizi, Stittsville (CA)

(73) Assignee: Ciena Corporation, Hanover, MD (US)

( * ) Notice: Subject to any disclaimer, the term of this patent is extended or adjusted under 35 U.S.C. 154(b) by 133 days.

(21) Appl. No.: 17/470,355

(22) Filed: Sep. 9, 2021

(65) Prior Publication Data
US 2023/0074349 A1    Mar. 9, 2023

(51) Int. Cl.
*H04J 14/02* (2006.01)

(52) U.S. Cl.
CPC ...... *H04J 14/0227* (2013.01); *H04J 14/0287* (2013.01)

(58) Field of Classification Search
CPC .......................... H04J 14/0227; H04J 14/0287
See application file for complete search history.

(56) References Cited

U.S. PATENT DOCUMENTS

| | | | |
|---|---|---|---|
| 5,590,143 A * | 12/1996 | Takara | H01S 3/1109 372/18 |
| 8,812,421 B1 * | 8/2014 | Ledbetter, Jr. | G06Q 10/04 706/46 |
| 8,849,882 B2 | 9/2014 | Aouini et al. | |
| 8,855,215 B2 | 10/2014 | Roberts et al. | |
| 8,948,596 B2 * | 2/2015 | Nielsen | H04B 10/2575 398/115 |
| 8,949,918 B2 * | 2/2015 | Totten | H04B 10/25751 725/111 |
| 9,686,599 B2 | 6/2017 | Maamoun | |
| 9,774,394 B2 | 9/2017 | Harley et al. | |
| 10,187,197 B2 | 1/2019 | Aouini et al. | |
| 10,243,671 B1 * | 3/2019 | Aouini | H04B 10/6163 |
| 10,281,523 B2 | 5/2019 | Aouini et al. | |
| 10,298,356 B1 | 5/2019 | Châtelain et al. | |
| 10,320,374 B2 | 6/2019 | Parvizi et al. | |
| 10,330,962 B1 | 6/2019 | Calvo et al. | |
| 10,404,401 B1 | 9/2019 | Maamoun et al. | |
| 10,425,099 B1 | 9/2019 | Aouini et al. | |
| 10,484,267 B2 * | 11/2019 | Gerstel | H04L 41/40 |

(Continued)

FOREIGN PATENT DOCUMENTS

EP    3672111 A1 *  6/2020    ....... H04B 10/25073

*Primary Examiner* — Tanya T Motsinger
(74) *Attorney, Agent, or Firm* — Baratta Law PLLC; Lawrence A. Baratta, Jr.

(57) ABSTRACT

Systems and methods for controlling network configurations or assignments are provided. A method, according to one implementation, includes a step of calculating transmission characteristics between each pair of a plurality of pairs of modems at opposite ends of a Dense Wavelength-Division Multiplexing (DWDM) transport link using specifications of the modems measured during production. The method also includes the step of selecting a pair of modems from the plurality of pairs of modems based on results obtained by calculating the transmission characteristics and based on one or more user-defined service requests.

19 Claims, 9 Drawing Sheets

(56) References Cited

U.S. PATENT DOCUMENTS

| | | | |
|---|---|---|---|
| 10,536,303 B1 | 1/2020 | Pike et al. | |
| 10,554,453 B1 | 2/2020 | Parvizi et al. | |
| 10,678,112 B2 | 6/2020 | Parvizi et al. | |
| 10,680,585 B2 | 6/2020 | Aouini et al. | |
| 10,686,543 B1 | 6/2020 | Al Sayeed et al. | |
| 10,715,169 B1 | 7/2020 | Aouini et al. | |
| 10,727,854 B1 | 7/2020 | Greshishchev et al. | |
| 10,749,536 B1 | 8/2020 | Aouini et al. | |
| 10,805,064 B1 | 10/2020 | Aouini et al. | |
| 10,826,514 B1 | 11/2020 | Honarparvar et al. | |
| 10,848,164 B1 | 11/2020 | Wen et al. | |
| 10,855,380 B2 | 12/2020 | Aouini et al. | |
| 10,903,841 B1 | 1/2021 | Parvizi et al. | |
| 10,931,292 B1 | 2/2021 | Shalmani et al. | |
| 10,965,300 B1 | 3/2021 | Weng et al. | |
| 10,979,059 B1 | 4/2021 | Shalmani et al. | |
| 10,985,900 B1 | 4/2021 | Abdo et al. | |
| 11,012,081 B2 | 5/2021 | Parvizi et al. | |
| 11,057,690 B2 | 7/2021 | Al Sayeed et al. | |
| 11,356,174 B1* | 6/2022 | Golaghazadeh | H04B 10/27 |
| 2004/0062550 A1* | 4/2004 | Terahara | H04J 14/02 398/91 |
| 2005/0031027 A1* | 2/2005 | Noma | H04M 11/062 375/222 |
| 2006/0285489 A1* | 12/2006 | Francisco | H04L 45/851 370/465 |
| 2012/0251121 A1* | 10/2012 | McNicol | H04J 14/06 398/91 |
| 2013/0236169 A1* | 9/2013 | Gaudette | H04J 14/0257 398/140 |
| 2013/0308943 A1* | 11/2013 | Young | H04Q 11/0001 398/45 |
| 2013/0329706 A1* | 12/2013 | Haiut | H04W 24/02 370/336 |
| 2014/0241724 A1* | 8/2014 | McGarry | H04Q 11/0071 398/67 |
| 2015/0181442 A1* | 6/2015 | Zinevich | H04B 17/318 455/424 |
| 2015/0333824 A1* | 11/2015 | Swinkels | H04J 14/0241 398/25 |
| 2016/0234580 A1* | 8/2016 | Clarke | H04L 47/828 |
| 2017/0214467 A1* | 7/2017 | Djukic | H04L 45/124 |
| 2017/0310392 A1* | 10/2017 | Boertjes | H04Q 11/0062 |
| 2019/0386808 A1* | 12/2019 | Finkelstein | H04L 5/14 |
| 2020/0145178 A1* | 5/2020 | Finkelstein | H04L 5/0094 |
| 2020/0177194 A1 | 6/2020 | Aouini et al. | |
| 2021/0144234 A1* | 5/2021 | Furusawa | H04L 43/045 |
| 2023/0074349 A1* | 3/2023 | Maamoun | H04J 14/0227 |

* cited by examiner

MATCHING TRANSMITTERS WITH RECEIVERS FOR MAKING NETWORK-LEVEL ASSIGNMENTS

TECHNICAL FIELD

The present disclosure generally relates to optical networking systems and methods. More particularly, the present disclosure relates to matching transmitter components and receiver components of different modems based on one or more user-defined service requests and further based on Signal-to-Noise Ratio (SNR) specifications and jitter specifications of the modems measured during production.

BACKGROUND

Generally, Path Computation Engines (PCEs) are used for computing acceptable transmission paths (e.g., routes, links) between nodes in a communications network (e.g., optical network). Paths may include direct transmission of signals between adjacent nodes or may include transmission via one or more intermediate nodes, depending on the specific topology of the network and the specific source and destination nodes attempting to communicate with each other.

Currently, conventional systems may utilize various algorithms for detecting suitable routes. Some of these algorithms use measured parameters on the source and destination nodes and/or on the links themselves. For example, the Bit Error Rate (BER), linear impairments (such as Chromatic Dispersion (CD), Polarization Mode Dispersion (PMD), Polarization Dependent Loss (PDL), etc.), or other fiber non-linearities of a link may be some parameters that can be used for path computation. Another example of a useful parameter in path computation algorithms is link Optical Signal-to-Noise Ratio (OSNR), i.e., measured or estimated at the ingress of the optical receiver. In optical networks, Optical SNR (OSNR) may be used. Certain thresholds may be established as a minimum OSNR for transmission in an optical network, whereby this parameter may be referred to as a Require OSNR (ROSNR).

Conventional route validity tasks assume the following for an End-of-Life (EOL) ROSNR parameter based on production data:

$$ROSNR_{EOL} = Factory_{statistics} + Aging_{factors}$$

Also, the system is pre-set with particular optical receiver with a processor assigned to particular components in the network. When a service request is received, the conventional PCEs typically assume that each transmitter and receiver at the various nodes have the same operating parameters. Since transmitters and receivers may actually have differing parameters, path computation may be based on this inaccurate assumption.

Conventional systems are not configured to consider optimal transmitter (Tx) and receiver (Rx) matching along available light-paths and based on specific service requirements. Also, conventional systems may instead overuse certain components, which can be a waste of resources in some situations. For example, these conventional systems may operate in a way that could lead to the inability to enable a service request based on available cards at customer sites. Also, they do not permit a trade-off between different requests, although the possibility may be available. This may also lead to blind defragmentation or restoration processes in a flexible spectrum system. Therefore, there is a need in the field of communication networks to further optimize path computation, such as by considering the variability in the operating characteristics of various Tx and Rx components and conducting path computation techniques based on these characteristics.

BRIEF SUMMARY

The present disclosure focuses on systems and methods for enabling network control to match transmitter and receiver components to conduct path computation, select modems or transponders at source and destination nodes, modifying modulation characteristics of transmission signals, performing spectrum assignment, etc. According to one implementation, a process is configured for optimally matching pairs of transmitters and receivers in a network. The process may include, for example, a step of calculating transmission characteristics between each pair of a plurality of pairs of modems at opposite ends of a Dense Wavelength-Division Multiplexing (DWDM) transport link using specifications of the modems measured during production. The process may also include the step of selecting a pair of modems from the plurality of pairs of modems based on results obtained by calculating the transmission characteristics and based on one or more user-defined service requests.

According to some embodiments, the selecting step may be performed in order to make network-level assignments. For example, the network-level assignments may include a) a service assignment, b) detection of an optical Layer 0 restoration path or protection path, c) wavelength assignment or spectrum assignment in an elastic spectrum system, d) path computation, e) defragmentation in a gridless network, f) line rate or Baud rate assignment, and/or other actions.

Selecting the pair of modems may include detecting the interaction of transmitter and receiver components of a first modem at a first node with transmitter and receiver components of a second modem at a second node, the first and second nodes being located on opposite sides of the DWDM transport link. The DWDM transport link, according to some embodiments, may be any of a Data Center Interconnect (DCI) link, a metro link, a regional link, a long haul link, and a submarine link.

The step of selecting the pair of modems may include the step of considering: a) route selection, b) a number of fiber spans, c) line rates, d) channel spacing, e) operational characteristics, and/or other characteristics or functions. The process may further include the step of squeezing two channels of an elastic spectrum when a receiver Signal-to-Noise Ratio (SNR) of the two channels meets specific criteria based on associated cross-talk and jitter penalties.

Before calculating the transmission characteristics between each pair of the plurality of pairs of modems, the process may also include the steps of a) measuring the specifications of transmitter components and receiver components of the modems, and b) populating a modem database with the measured specifications. For example, measuring the specifications of the transmitter components and receiver components of the modems may include the step of generating polynomials to fit the transmitter components and receiver components to model an optical network. The modem database in some cases may include a look-up table.

Each of the plurality of modems may include one or more transmitter components and one or more receiver components mounted on a modem card. The selected pair of modems may be selected based on a) a network type, b) a number of service requests obtained, c) user-defined policies, d) client priorities, e) Service Level Agreements (SLAs), and/or other criteria. The transmission characteristics may include a) Signal-to-Noise Ratio (SNR) of a transmitter component of a respective modem, b) SNR of a receiver component of the respective modem, c) intrinsic jitter of the transmitter component, d) intrinsic jitter of the receiver component, and/or other parameters. Each modem may include a Digital-to-Analog Converter (DAC) device and a Phase-Locked Loop (PLL) device.

In some embodiments, the process may further comprise the step of calibrating each modem with respect to an ideal modem circuit. The process may also include the steps of 1) obtaining one or more multiple user-defined service requests and 2) matching multiple pairs of modems based on measured transmission characteristics and the specifications measured during production in order to meet the multiple user-defined service requests and to share an optical-traffic load required by the multiple user-defined service requests. Furthermore, the process may include the step of planning multiple matches between pairs of modems, where the multiple matches may be used at different times in the future. Also, selecting the pair of modems may be configured to optimize reach, capacity, and channel spacing in a gridless spectrum network. In addition, selecting the pair of modems may include using a) game theory analysis, b) linear programming, c) heuristics, and/or other techniques.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
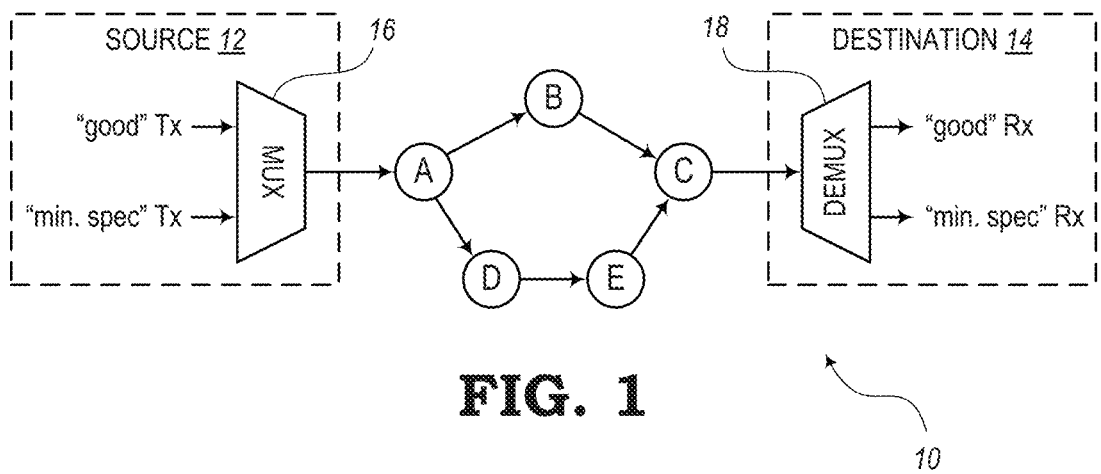
FIG. 1 is a diagram illustrating a section of a network where multiple transmitter and receiver resources can be utilized more efficiently for meeting specific service requirements, according to various embodiments of the present disclosure.

The present disclosure relates to systems and methods for better utilizing network resources. As mentioned above, conventional systems may utilize Bit Error Rate (BER) and Signal-to-Noise Ratio (SNR) (or Required Optical SNR (ROSNR)) for computing paths (e.g., route selection) in a network (e.g., optical network). Normally, it might be assumed that the same devices in a network will have the same specifications. Although these specifications (e.g., SNR, clock jitter, etc.) may be known during a production process (i.e., when these components are manufactured), these specifications are usually only used to determine if the components meet certain criteria.

In other words, the testing of these components during production may simply include determining if the SNR, clock jitter, and/or other parameters of each component fall within an acceptable range. For example, according to some tests, 400 Gbps modems were analyzed during production to have certain ranges of variability with respect to SNR and clock jitter. Those outside an acceptable range may be discarded. However, the components that pass this test may still have an acceptable variability (e.g., an SNR between about 16.8 dB and about 17.8 dB, a clock jitter between about 200 fs and about 800 fs, etc.).

Again, the conventional systems do not consider this variability in the process of path computation. On the other hand, the embodiments of the present disclosure are configured to take this variability into consideration to compute paths or routes in a network. In this way, certain operating parameters (e.g., SNR, jitter, etc.) can be stored, based on tests performed at production, for individual transmitters and receivers at the various nodes of a network. Then, when the transponder cards including these individual transmitter and receiver components are deployed in the network, the parameters of the devices can be used during operation in a personalized manner, which is not possible in conventional systems since the parameters tested during production are usually not stored for use during operation but instead are normally only used for testing whether the components meet certain productivity requirements.

Therefore, the embodiments of the present disclosure are configured to perform routing techniques based on specific card-level parameters, whereby the transponders may be mounted on cards (e.g., printed circuit boards). It may be noted that these transponders may include one or more transmitter devices and one or more receiver devices, in additional to other electrical circuitry, optical components, electro-optic components, etc. Since each individual transmitter and receiver may also be tested at production to determine various characteristics, the present disclosure provides systems and methods that are configured to utilize each of the components on a personalized basis based on how it may operate with other matching components on other nodes in the network. Hence, the present embodiments may be configured to consider the acceptable pairs of Tx devices and Rx devices for meeting user-defined service requirements and may even be configured to determine the "best" Tx and Rx matching when these components are available. The embodiments of the present disclosure may also utilize the resources in a more efficient manner, such as by utilizing Tx and Rx components that may not necessarily be the best match, but together may provide acceptable results for meeting service requirements.

Also, the term transponder is used herein, and those skilled in the art will recognize other terms are equally applicable such as transceiver, modem, etc.

In addition to determine acceptable Tx and Rx components, the systems and methods of the present disclosure are also configured to perform other functions, such as determining routes from a source node to a destination node. These routes (e.g., light paths) may also be utilized in an efficient manner to reduce a waste of resources, as long as the components and routes can be used in a way that meets service requests. For example, in some cases, a planning strategy may be used to determine how multiple resources (i.e., components at each of the nodes, links throughout the network, etc.) are used at different points in time to meet anticipated demand, even during known peak operational times in the future.

To be able to accommodate the increased data rates and increased number of communicating devices on the Internet, new techniques in optical telecommunications are being developed. The main vehicles for high-capacity networks are software-defined transceivers that use programmable coherent detection/dual polarization, flexible/elastic optical switches, cognitive routing algorithms, etc.

The variability of various parameters (e.g., SNR, jitter, etc.) of the transceiver cards measured at production is not leveraged in the conventional systems. However, the embodiments described in the present disclosure can automatically leverage these parameters to allow better network-level assignment decisions.

As an example of such variabilities, a set of 700 Digital Signal Processor (DSP) chips were tested at production. The SNR performance was measure for each DSP chip and varied from about 16.7 dB to about 18.3 dB. The measured variability in performance may have been much higher for at least two main reasons. First, the type of Device Under Test (DUT) may be changed from a 28 nm device (e.g., one type of DSP chip product) to a 7 nm device (e.g., a fin-type Field Effect Transistor (FinFET) using an analog manufacturing process). For example, in the FinFET, both random and systematic process technology variations are expected to be higher. As an example, phase noise Voltage Controlled Oscillator (VCO) simulations show 11 dB variation between the best case and worst case (e.g., on average from about 100 kHz to about 10 MHz frequency offset). This may translate to a doubling of the intrinsic jitter.

Second, moving from discrete high-quality optics to low cost, low power, decreased size silicon photonics integrated circuits may lead to an issue in the platform where a high-index contrast Silicon on Insulator (SOI) is used for photonic devices is sensitive to dimensional variations. The width or the height variation of the devices will cause a proportional shift in the spectral response. These variations may affect devices such as Mach-Zender (MZ) modulators, rings, directional couplers, photo diodes, and the like. By using the thermo-optic effect in silicon, thermal tuning can be utilized to compensate for non-uniformity in resonant structures (e.g., ring resonators, etc.), but the power required for this tuning is high and the range is narrow, as described in S. Selvaraja, W. Bogaerts, P. Dumon, D. Van Thourhout, and R. Baets, "Subnanometer linewidth uniformity in silicon nanophotonic waveguide devices using CMOS fabrication technology," IEEE Journal of Selected Topics in Quantum Electronics, vol. 16, no. 1, pp. 316-324, January-February 2010, as well as Xi Chen, "Process Variation in Silicon Photonic Devices", PhD thesis, University of Colorado at Boulder, 2014.

The process variation may cause variation in the resonance frequency, the half-wave ($V_{pi}$) voltage, the bandwidth of the MZ modulator, and the responsivity and bandwidth of photo diodes in a single die or die-to-die. The process variation may induce mismatch between the two arms of a MZ modulator and can even create asymmetry in the differential response of the modulator and degrade the OSNR of the link.

Also, the implementation noise may be caused by Digital-to-Analog Converter (DAC) quantization noise, Analog-to-Digital Converter (ADC) quantization noise, uncompensated delays in I/Q, uncompensated power balance in X/Y (e.g., appearing as extra Polarization Dependent Loss (PDL)), thermal noise, phase noise, and so on. Besides the quantization effects from converters, most of the other impairments may vary from card to card.

In the present disclosure, not only are these parameters of individual components measured and stored during production, but also the variability of these parameters from one component to another may be exploited. Therefore, this may be considered to be a novel physical model that allows for optimizing optical systems for different assignment applications, such as a) service assignment, b) optical protection (e.g., restoration path) services, c) elastic spectrum defragmentation services, and others.

The embodiments of the present disclosure provide optimization systems and methods for finding the "best" Tx/Rx pairs or couples (out of multiple existing choices) at both ends of a Dense Wavelength-Division Multiplexing (DWDM) transport link. These best pairs/couples may be matched when assigning new service requests during normal use of the components within the network. The "best" matching may be achieved, for example, in the context of a tactical interaction of different components of the optical links (e.g., as used in game theory), when a service is enabled by taking other requests into consideration. The requests may also include the following degrees of freedom: a) route selection, b) reach (e.g., number or length of fiber spans, hops, etc.), c) line rate or Baud rate, d) spacing of in-service channels in gridless or flexible spectrum applications, e) operations, etc.

FIG. 1 is a diagram illustrating an embodiment of a section of a network 10. In this embodiment, the network 10 includes a first node 12 (e.g., a source node) and a second node 14 (e.g., a destination node). A first path (or route) from the first node 12 to the second node 14 includes links (e.g., fiber spans, light paths, etc.) for transmitting signals through intermediate nodes including Node A, Node B, and Node C. A second path (or route) from the first node 12 to the second node 14 includes links (e.g., fiber spans, light paths, etc.) for transmitting signals through intermediate nodes including Node A, Node D, Node E, and Node C. The first node 12 includes a multiplexer (MUX) 16 for enabling transmission of signals from one of multiple transmitter (Tx) components. In this embodiment, the Rx components may include a "good" Tx and a "minimum spec" Tx and may further include any number of Tx components having various performance characteristics (e.g., measured at production). Also, the second node 14 includes a demultiplexer (DE- MUX) 18 for enabling the reception of signals to one of multiple receiver (Rx) components. In this embodiment, the Rx components may include a "good" Rx and a "minimum spec" Rx and may further include any number of Rx components having various performance characteristics (e.g., measured at production).

According to the embodiments of the present disclosure, the multiple transmitter and receiver resources can be utilized more efficiently to meet specific service requirements. A control or management device may be configured to provide an end-to-end optimization process for utilizing the available transmitter and receiver devices. When implementing a new set of service requests, the control or management device may be configured to provide routing actions and other network assignment actions. For example, the control/management device may be a tool of a Software Defined Network (SDN) controller.

The SDN controller may select a route or light path (e.g., using a Path Computation Engine (PCE) or the like) from the first node 12 (e.g., source node) to the second node 14 (e.g., destination node). In addition to the database (DB) that the routing algorithm is using to choose the target route, we added some reported statistics about Tx(s) and Rx(s) as new data. For the case below, the routing algorithm can match the good cards on both ends on the shortest-path (the upper path) to achieve a better quality of service (QoS) or increase the offered capacity in terms of the increase of the line rate for the same path. However, without considering the "Minimal Spec" Tx matching with the remaining available receivers, we might not be able to meet the service level agreement (SLA) for the next service request since both "Minimal Spec" Tx/Rx do not achieve the ROSNR for any of the two routes (e.g., due to low overall SNR or high accumulated intrinsic jitter that can cause cycle-slip, etc.). As an example, it may be determined that using the "good" Tx, signals may be transmitted to any Rx device using either path (i.e., A-B-C or A-D-E-C). Also, it may be determined that using the "minimal spec" Tx, only the first path (i.e., A-B-C) can be used for transmission to the "good" Rx and that neither path is acceptable for transmission to other Rx devices.

Figure 2:
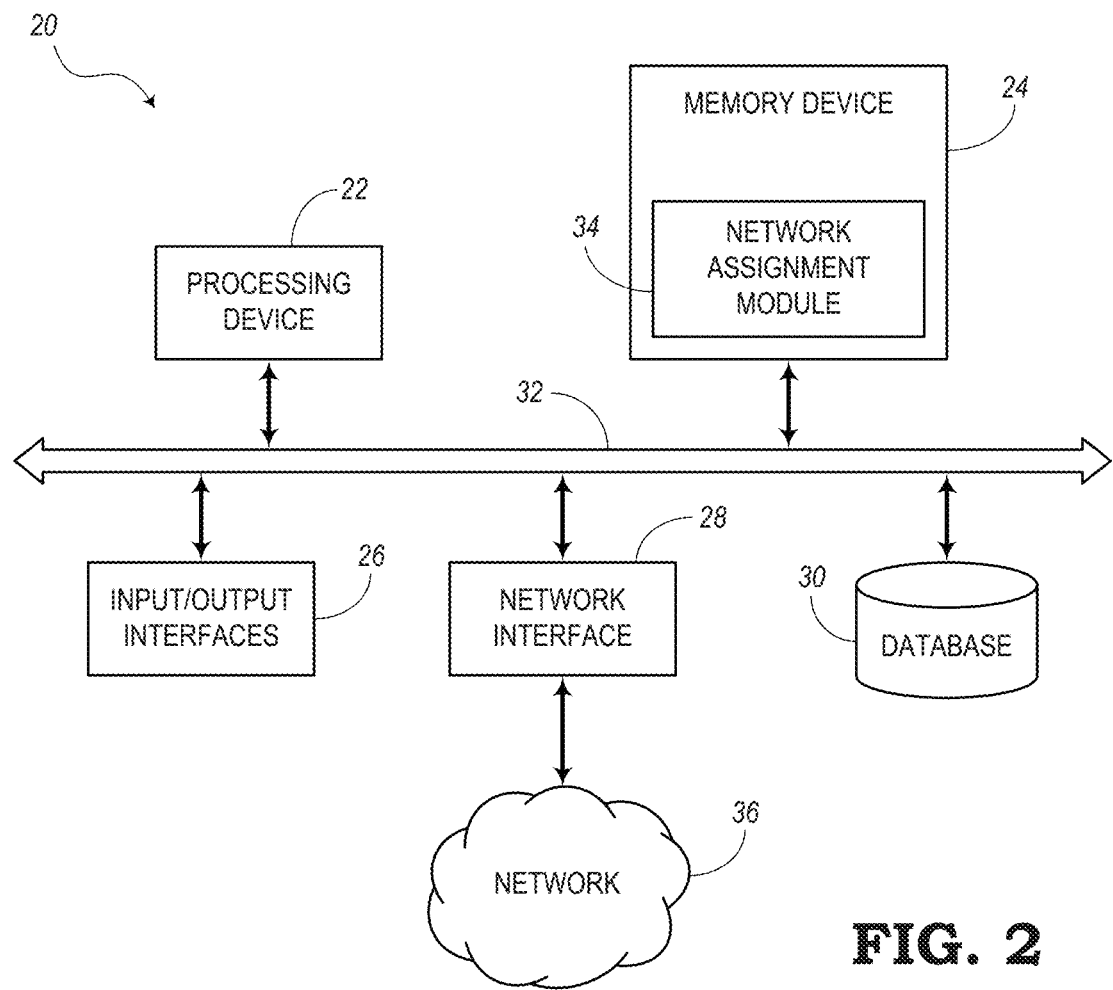
FIG. 2 is a block diagram illustrating a computer device for determining the utilization of various resources, according to various embodiments.

FIG. 2 is a block diagram illustrating an embodiment of a computer device 20 for determining the utilization of various resources in a network (e.g., network 10, 36). In the illustrated embodiment, the computer device 20 may be a digital computing device that generally includes a processing device 22, a memory device 24, Input/Output (I/O) interfaces 26, a network interface 28, and a database 30. It should be appreciated that FIG. 2 depicts the computer device 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the computer device 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the computer device 20 and may include, for example, an internal hard drive connected to the local interface 32 in the computer device 20. Additionally, in another embodiment, the data store may be located external to the computer device 20 and may include, for example, an external hard drive connected to the Input/Output (I/O) interfaces 26 (e.g., SCSI or USB connection). In a further embodiment, the data store may be connected to the computer device 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the computer device 20 to communicate over a network, such as the network 10 of FIG. 1, the network 36 shown in FIG. 2, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 10, 36.

The computer device 20 further includes a network assignment module 34, which may be implemented in any suitable combination of software, firmware, or middleware in the memory device 24 and/or hardware in the processing device 22. The network assignment module 34 may be configured to enable or cause the processing device 22 to perform a number of actions for determining pairs of transmitting devices and receiving devices that may be acceptable for carrying traffic, for determining routes or paths through a network, and other actions related to path computation and resource allocation. Also, the network assignment module 34 may also be configured for spectrum assignment functions for systems using flexible or gridless spectrum allocation so as to define channel characteristics for carrying traffic. Furthermore, the network assignment module 34 may be configured to cause the processing device 22 to execute other functions for assigning/allocating resources and waveband in a flexible manner in the network.

According to some embodiments, the network assignment module 34 may be configured to calculate transmission characteristics between each pair of a plurality of pairs of modems at opposite ends of a Dense Wavelength-Division Multiplexing (DWDM) transport link within the network 36. The network assignment module 34 may use specifications of the modems measured, for example, during production. In addition, the network assignment module 34 may be configured to enable the processing device 22 to select one specific pair from the plurality of pairs of modems based on results obtained by calculating the transmission characteristics and based on one or more user-defined service requests.

In some embodiments, the network assignment module 34 may also be configured such that the act of selecting the pair of modems may be performed in order to make network-level assignments. For example, the network-level assignments may include one or more of a) a service assignment, b) detection of an optical Layer 0 restoration/protection path, c) wavelength/spectrum assignment in an elastic spectrum system, d) path computation, e) defragmentation in a gridless network, f) line rate or Baud rate assignment, etc. Selecting the pair may include detecting the interaction of transmitter and receiver components of a first modem at a first node with transmitter and receiver components of a second modem at a second node. The first and second nodes may be located on opposite sides of the DWDM transport link.

The DWDM transport link may be a Data Center Interconnect (DCI) link. Selecting the pair may include considering one or more of route selection, number of fiber spans, line rates, channel spacing, and operational characteristics. The network assignment module 34 may further be configured to squeeze two channels of an elastic spectrum when a receiver Signal-to-Noise Ratio (SNR) of the two channels meets specific criteria based on associated cross-talk and jitter penalties.

Before calculating the transmission characteristics between each pair of the plurality of pairs of modems, the network assignment module 34 may further enable the processing device 22 to measure the specifications of transmitter components and receiver components of the modems and then populate a modem database (e.g., part of the database 30) with the measured specifications. Measuring the specification of the transmitter components and receiver components of the modems may also include the step of generating polynomials to fit the transmitter components and receiver components to model an optical network. The modem database, for example, may include a look-up table.

In addition, each of the plurality of modems may include one or more transmitter components and one or more receiver components mounted on a modem card. The selected pair of modems may be selected based on the context of one or more of a network type, a number of service requests obtained, user-defined policies, client priorities, and Service Level Agreements (SLAs). The transmission characteristics may include one or more of an Optical Signal-to-Noise Ratio (OSNR) of a transmitter component of a respective modem, an OSNR of a receiver component of the respective modem, intrinsic jitter of the transmitter component, intrinsic jitter of the receiver component, among other parameters. Each modem may include a Digital-to-Analog Converter (DAC) device and a Phase-Locked Loop (PLL) device, where the DAC device may be configured to measure the OSNR of the transmitter component and receiver component and the PLL device may be configured to measure the intrinsic jitter of the transmitter component and receiver component.

Furthermore, the network assignment module 54 may also be configured to enable the processing device 22 to calibrate each modem with respect to an ideal modem. The network assignment module 54 may also allow the steps of obtaining multiple user-defined service requests and matching multiple pairs of modems based on measured transmission characteristics and the specifications measured during production in order to meet the multiple user-defined service requests and to share a load required by the multiple user-defined service requests. The network assignment module 54 may also allow the step of planning multiple matches between pairs of modems, where the multiple matches are configured for use at different times in the future. Selecting the pair of modems may be configured to optimize reach, capacity, and channel spacing in a gridless spectrum network. Also, selecting the pair of modems may include using one or more of game theory analysis, linear programming, and heuristics.

The database 30 can be populated as part of the production process and used as part of a Path Computation Engine (PCE). The PCE, for example, may be part of or utilized in conjunction with the network assignment module 34. Different methods may be used to segregate the performance of Tx, per card, and Rx to create the entries in the database 30. In one example, as soon as a transponder is connected to a photonics module (e.g., a 12-channel colorless mux/demux device), the processing device 22 may be configured to fetch from the database 30 the following information: a) Tx SNR, b) Rx SNR, c) Tx intrinsic jitter, d) Rx intrinsic jitter, among other information stored during a testing process at a production facility (e.g., factory, manufacturing site, etc.).

Figure 3:
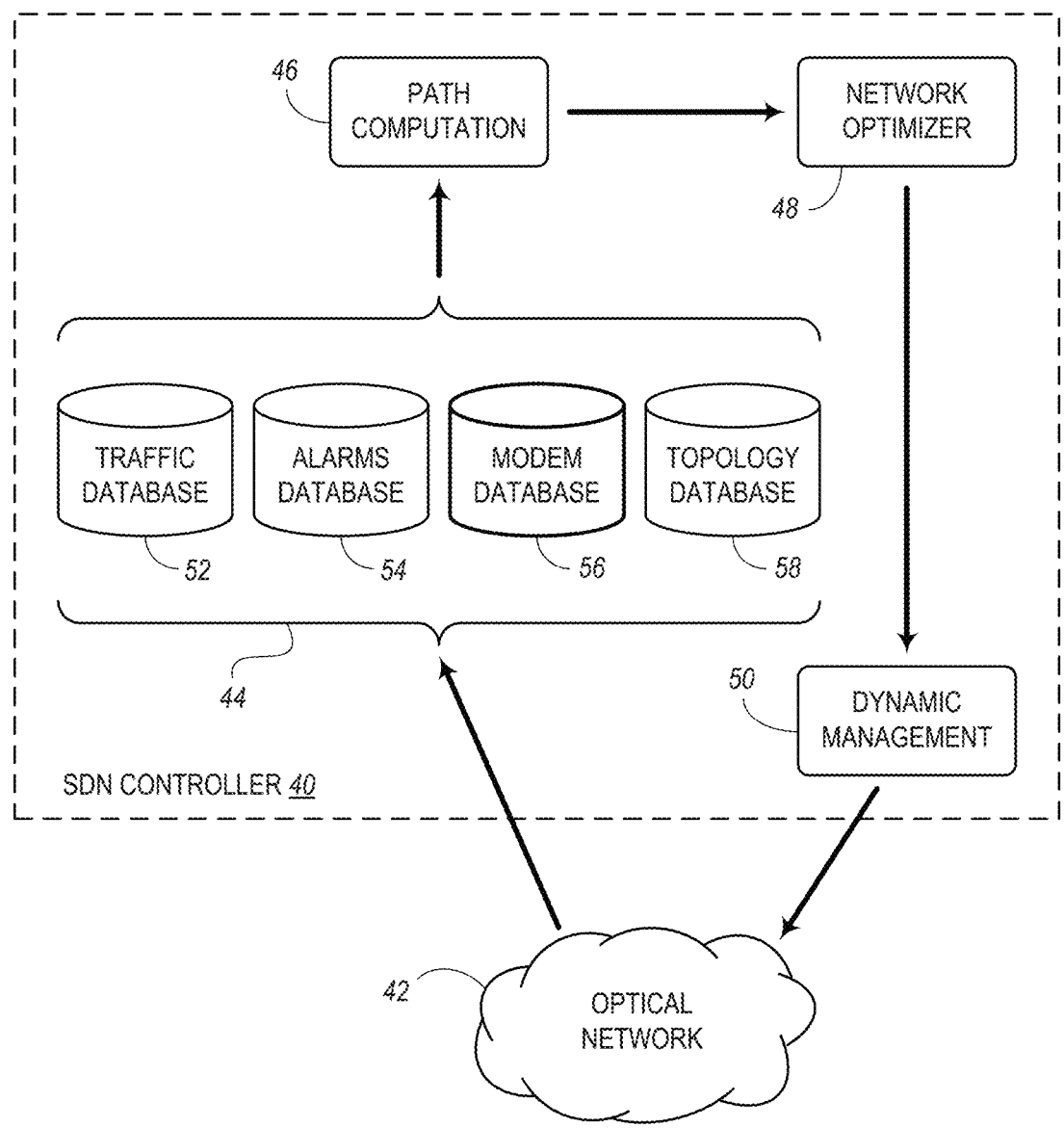
FIG. 3 is a block diagram illustrating a Software-Defined Network (SDN) controller, according to various embodiments.

FIG. 3 is a block diagram illustrating an embodiment of a Software-Defined Network (SDN) controller 40, which is configured to control network assignments in an optical network 42 (e.g., network 36). In some cases, the optical network 42 may be referred to as an Elastic Optical Network (EON). As illustrated in the embodiment of FIG. 3, the SDN controller 40 includes a database system 44, a path computation system 46, a network optimizer system 48, and a dynamic management system 50.

The database system 44 is configured to receive Performance Monitoring (PM) input, telemetry, SNR data, jitter data, and other suitable types of operational information from the optical network 42. For example, the database system 44 may receive information from modems (e.g., which may include transmitter components and receiver components) at multiple nodes in the optical network 42. In some embodiments, the database system 44 may include a traffic database 52, an alarm database 54, a modem database 56, and a topology database 58 for storing information obtained with respect to various aspects of the optical network 42. In particular, the modem database 56 is configured to store information about the specifications of modems, where these specifications may be measured and stored during production of the respective modems.

The path computation system 46 is configured to utilize the data from the database system 44 to determine suitable paths or routes through the optical network 42. The path computation system 46 may utilize the specifications of the modems, such as specific transmitter device information and receiver device information, in order to determine routes that meet user-defined service requests, SLAs, etc. In some embodiments, the path computation system 46 may compute a path that may be considered to be a primary path which may be suggested under normal operating conditions as well as one or more alternative paths (e.g., restoration paths, backup paths, protective paths, etc.). The alternative paths can be used in the situation where the primary path is unavailable (e.g., due to a fault in the primary path).

The network optimizer system 48 is configured to perform an optimization process for detecting the acceptable routes compute by the path computation system 46 to find the best routes. Again, the detection of routes may be based on matching one transmitter device on one transponder card with a receiver device on a different transponder card at a different node. Also, this matching does not necessary exclude transmitter and receiver devices considered to be inferior to the best devices. Thus, at times, the network optimizer system 48 may be configured to select a pair of modems (e.g., respective transmitter and receiver components) to find an acceptable match that meets user or service requirements to allow "better" components to be used to handle higher profile services or more challenging services.

The dynamic management system 50 is configured to work in conjunction with the path computation system 46 and network optimizer system 48 to dynamically control various switches and routers of the optical network 42 to control traffic patterns throughout the optical network 42. Also, the dynamic management system 50 is configured to control other network assignment parameters, such as the controlling of spectrum assignment when applicable. That is, spectrum assignment may be viable in cases where the optical network 42 utilizes flexible spectrum or liquid spectrum, in which the width of channels (or Network Media Channels (NMCs)) within the spectrum (or Media Channel (MC)) can be modified as needed to accommodate variable width wavelengths or "colors." For example, the dynamic management system 50 may use modulation control procedures for dynamically controlling spectrum channels (i.e., NMCs). Therefore, the output from the dynamic management system 50 includes network traffic control signals and network assignment (e.g., spectrum assignment) control signals.

It may be noted that gridless networking is being developed for flexible and dynamic transport networks and may be viewed as an alternative to fixed grid optical transmission systems that rely on a system that divides the available bandwidth into a number of channels having a fixed width to be used to carry traffic. Typically, fixed channels may have a width or grid spacing of 50 GHz or 100 GHz, while other systems may use a tighter grid spacing of 25 GHz or 33 GHz, such as in submarine applications.

In order to squeeze as much information as possible into the available light spectrum on a fiber (i.e., to improve spectral efficiency), a gridless (as opposed to fixed gird) network system allows more flexibility with respect to grid spacing to utilize the spectrum as needed. For example, a Wavelength Selective Switch (WSS) or Flexible Spectrum Switch (FSS) (e.g., which may be part of the dynamic management system 50) can be used as an active multiplexer/demultiplexer to enable control and automation of wavelength routing within the optical network 42. The FSS enables variable channel spacing and the elimination of wasted bandwidth. In other words, various optical channel speeds can coexist, utilizing maximum spectral efficiency, on the same optical fiber network. This will achieve economies of scale and lower the overall network cost.

The use of gridless technology results in the ability to provide flexible DWDM filtering for advanced modulation formats, such coherent detection. By being able to handle various bandwidth sizes per channel, this opens up the optical network 42 for advances in modulation formats, as the network is no longer constrained by traditional fixed optical line filtering. Thus, the dynamic management system 50 may also include suitable modulation control devices for flexible modulation.

Therefore, the SDN controller 40 may be configured to enable cognitive wavelength/spectrum assignment and routing by considering Tx/Rx "optimal" matching. The optimality may be based on context, such as network type, number of service requests, business priorities, SLAs, and so on. In some embodiments, this may be applied to restoration in Layer 0 light paths or routes.

Also, the SDN controller 40 can be applied to the challenging task of defragmentation in gridless networks. For example, fragmentation in a flexible spectrum network includes the accumulation of various remnants of spectrum that are not utilized. These fragments may be too narrow to handle traffic and are thus unusable. Defragmentation is the process of reconfiguring the spectrum channels to more efficiently the end of one channel with the beginning of the next to better utilize the entire spectrum.

The spectrum fragmentation is normally a challenge in EONs. Unaligned NMCs in the network may be referred to as fragmented spectrum. The dynamic management system 50 may use defragmentation techniques to realign or rearrange the available NMCs to make better use of the spectrum and create room for new connection requests.

The SDN controller 40 may also be configured to extend the physical layer (i.e., Layer 0/1) model used in routing/link budgeting (e.g., route validation) to consider Tx/Rx SNRs of two different cards individually. SNR (linear) may be calculated by the following:

$$1/SNR = (1/SNR_{tx} + 1/SNR_{rx}) + 1/SNR_{line} + 1/SNR_{nonlinearity} + 1/SNR_{cross-talk} \quad \text{(Eq. 1)}$$

Also, unlike conventional system, the SDN controller 40 may be configured with the modem database 56 for enhancing the visibility of optical networks. That is, the information regarding the specifications of modem (e.g., transmitter, receivers, etc.) obtained during the production process can be stored for use during operations of the optical network 42. This modem information can be used on top of the typical Performance Monitoring (PM) data that is obtained while the optical network 42 is in operation. Thus, the pre-operation production information stored in the modem database 56 can be used along with the currently-obtained operational information stored in the other databases 52, 54, 56. For example, the present disclosure is configured to measure or test the modems (e.g., modems) at the factory or manufacturing facility and/or obtained test results at production and populate the modem database 56 for later use (i.e., when the modems are actually put into use). Among the parameters that can be stored during production and used during operation, for example, are the factory SNR (separately for each of the Tx and Rx components) and factory jitter. For example, knowledge of the factory jitter can be used to avoid cycle slip during operation.

In addition, the SDN controller 40 can use the modem database 56 to "explore" options when executing service requests by optimizing reach/capacity. In gridless networks, the SDN controller 40 can also be configured to optimize channel spacings. Furthermore, in some cases, when permitted, the SDN controller 40 may be configured to schedule service requests to allow the implementation of further optimization. The more cards (e.g., transponder cards) connected and services to be enabled, the more trade-off that can be exercised by the SDN controller 40.

Figure 4:
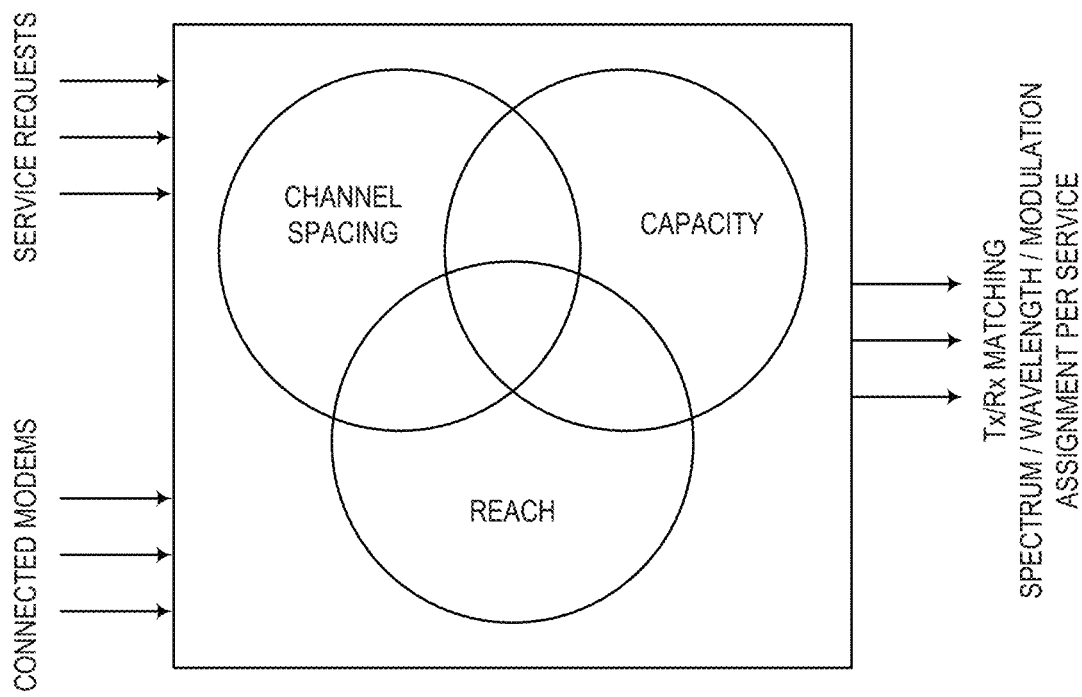
FIG. 4 is a diagram illustrating a conceptual view of a process for utilizing service requests and available components of a network to match transmitters with receivers and create spectrum assignments per service, according to various embodiments.

FIG. 4 is a diagram illustrating a conceptual view of a process, according to some implementations, for utilizing service requests and available components of a network to match transmitters with receivers and create spectrum assignments per service. For example, the process of FIG. 4 may be implemented by the SDN controller 40 or other suitable system for controlling network assignments (e.g., routing, modem selection, modulation control, spectrum assignment, etc.) in a network.

The system associated with the functionality of FIG. 4 is configured to receive service requests, which may be entered by a user (e.g., network manager, network operator, etc.) and/or by customers/clients. The system also obtained information regarding connected modems, which may include topology information of the network. Processing may include the use of these inputs to perform various channel spacing functionality, capacity analysis functionality, reach analysis functionality, etc. For example, the system, which operates the methods of FIG. 4, may be configured to find an intersection of two or all of the three considerations (or functionalities) to find Tx/Rx matches, which may be based on weighted values for each consideration. In addition to Tx/Rx matching, the system can also be configured to determine assignment with respect to spectrum, wavelengths, modulation, etc. for the EON. This assignment can be processed per service.

For example, performing these functions to find suitable overlaps can be done by the mean of one or more suitable "game theory" techniques, linear programming techniques, heuristics, and/or other algorithmic-based methods. The methods can be applied to assigning different Baud rates when available.

It should be noted that a differentiator between the embodiments of the present disclosure and conventional systems is that the present embodiments include methodologies with respect to factory-collected data in order to enable a full-scale optimization mechanism. In other words, to fully appreciate the "value proposition," a modification to the conventional processes includes characterizing network cards (e.g., transponder cards) in the factory, which includes an upgrade of traditional methodologies. Below are some details of possible implementations according to the present disclosure.

According to some embodiments, a first step may include segregating Tx components from Rx components to determine the performance per card, since they may not normally be used in a loopback situation. Once the Tx and Rx components are segregated, the present disclosure provides two methods in additional to other proposed operations as may be considered based on an understanding of the concepts discussed in the present disclosure. The first method discussed below uses current settings with a small adjustment; while the second method may require more planning and more changes to the conventional process.

The first method of the present disclosure, which may include other suitable methods as may be understood by one of ordinary skill in the art from an understanding of the present disclosure, can use the same card in loopback but enable an "eye-mapper" to measure SNR of the Tx. The eye-map, for example, may refer to a measure of Q-factor with respect to OSNR which may illustrate somewhat of an "eye" pattern as seen on an oscilloscope. The method then includes segregating the Tx from the Rx based on the measured Required Optical Signal-to-Noise Ratio (ROSNR) for different modulation formats. For example, one type of component (e.g., a Digital Signal Processor (DSP) chip) has more than 1 dB range in performance. Built-in test instruments in the Tx DAC and PLL allow for the testing, characterization, and performance monitoring. For example, the SNR of the DAC can be assessed using the built-in under-sampling scope that digitizes the output of the DAC under a periodic test stimulus applied through the transmitter's test stimulus pattern memory. Also, the PLL's jitter and phase noise can be monitored in real-time using the built-in jitter measurement instrument. This jitter measurement is described in Aouini et al., "Techniques and circuits for on-chip jitter and phase noise measurement in a digital test environment," Sep. 19, 2017. PRB. 170410.2 and M. Parvizi, S. Aouini, M. S. Mahani, N. Ben-Hamida, J. F. Bousquet and C. Kurowski, "An Under Sampling Scope for Characterization of 42-Gs/s DAC in 28-nm FD-SOI," in IEEE Microwave and Wireless Components Letters, vol. 28, no. 7, pp. 621-623, July 2018.

Figure 5:
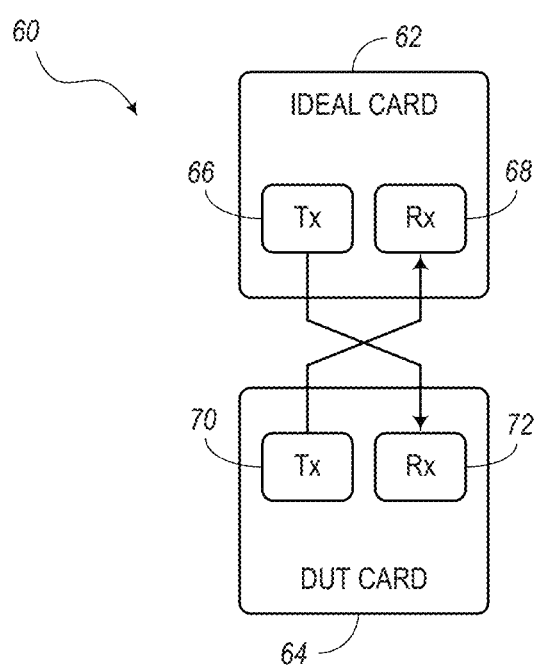
FIG. 5 is a diagram illustrating an arrangement of a Device Under Test (DUT) with an ideal device for testing transmitters and receivers during production in order to populate a database to be used during network operation, according to various embodiments.

FIG. 5 is a diagram illustrating an embodiment of a circuit 60 having a testing arrangement for testing a Device Under Test (DUT) with respect to an ideal or "golden" device. This arrangement may be used as the second method for testing transmitters and receivers during production in order to populate the modem database 56 that can be used during network operation. The circuit 60 includes the ideal card 62 in communication with a DUT card 64. The ideal card 62 includes a transmitter (Tx) component 66 and a receiver (Rx) component 68. Also, the DUT card 64 includes a Tx component 70 and a Rx component 72. The circuit 60 is arranged such that the Tx component 66 of the ideal card 62 communicates test signals to the Rx component 72 of the DUT card 64 and the Tx component 70 of the DUT card 64 communicates test signals to the Rx component 68 of the ideal card 62.

In this second method, the factory data can be collected using many techniques. As shown in FIG. 5, the ideal card 62 (or other theoretically ideal card) is used when characterizing each card being tested (e.g., DUT card 64) as part of a calibration process. Characterized SNR of the Tx component 70 and/or Rx component 72 of the DUT card 64 can be measured as follows:

$$1/SNR = 1/SNR_{tx\_ideal} 1/SNR_{rx\_DUT}$$

$$1/SNR = 1/SNR_{tx\_DUT} + 1/SNR_{rx\_ideal}$$

The results of testing the SNR of the Tx and Rx components 70, 72 can be used to populate the modem database 56.

Also, intrinsic jitter can be measured as follows:

$$Jitter_{Rx\_DUT} = \sqrt{[(Measured\_Jitter\_Total^2) - (Jitter_{Tx\_ideal}^2)]}$$

$$Jitter_{Tx\_DUT} = \sqrt{[(Measured\_Jitter\_Total^2) - (Jitter_{Rx\_ideal}^2)]}$$

It may be noted that these methods distinguish between Tx and Rx per card and search for optimal matching of different cards at both ends of networks.

The following describes operating principles of the various embodiments of the present disclosure. First, one or more service requests (e.g., including a demand for capacity from a source (e.g., source node 12) to a destination (e.g., destination node 14) may be received. If there is available access to the modem database 56 for the transponder cards at the source and destination, then the following may be performed:

a) If scheduled to be available immediately, a search for best Tx/Rx matching may be performed to enable the service to start. The search may be configured to determine that the information about the Tx components and Rx components (e.g., on source cards and destination cards) is available. This may include available card information, available wavelength/spectrum information, route information, associated OSNR information, among other information.

b) If scheduled for a later time (or part of a planned strategy), as in the case of switching traffic based on hours of day (e.g., Netflix links using backup paths, business links, etc.), then the SDN controller 40 may be configured to bundle packets and look for acceptable and/or best Tx/Rx matching to enable them all.

A brute-force method can iterate over Eq. (1) described above by trying different available links with all Tx/Rx combinations to search for cases where all service requests are met. This process may also take into consideration customer polices, SLAs, and other suitable parameters as weighted coefficients.

Figure 6:
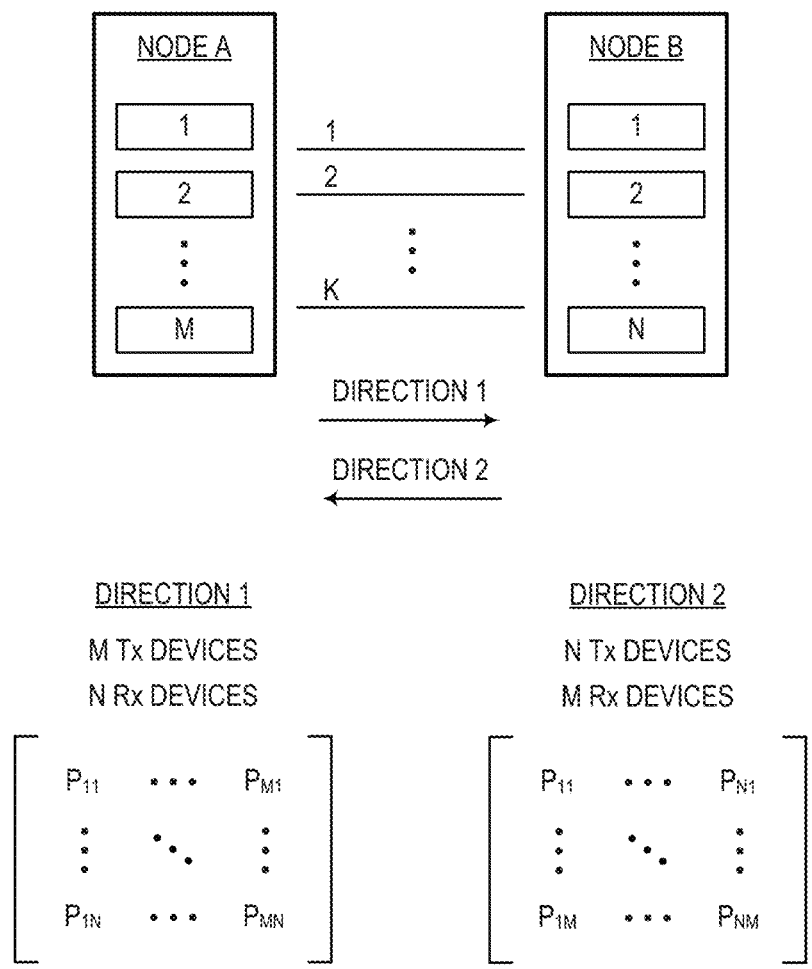
FIG. 6 is a diagram illustrating matrices for storing parameters measured during production of pairs of various components in a network, according to various embodiments.

FIG. 6 is a diagram illustrating an example of matrices for storing parameters measured during production of pairs of various components in a network. Assume, for example, that there are a first number (M) of transponders (e.g., Tx components) at a first node and a second number (N) of transponders (e.g., Rx components) at a second node on an opposite side of a transport link from the first node. Also assume that there are a third number K of light-paths (e.g., fiber spans) available between the first set of transponders and the second set of transponders. For example, in one direction, there may be M Tx components at the first node and N Rx components at the second node for transmission in the direction from the first node to the second. Similarly, there may be N Tx components at the second node and M Rx components at the first node for transmission in the opposite direction from the second node to the first node. In this case, two matrices can be filled to cover both directions (i.e., from Node A to Node B and from Node B to Node A), as this is usually required to enable service in both directions, although the two directions may differ with respect to capacity requirements.

In the case of gridless networks, "spacing optimization" routines between channels assigned to one Multiplexer/Demultiplexer (MD) is possible. Usually link budgeting tools are configured to add hysteresis to account for laser drift of neighboring channels. As such, based on one particular model, it is possible to estimate channel spacing and squeeze channels if Rx SNRs of both channels allow for the associated linear cross-talk and jitter penalty.

Figure 7:
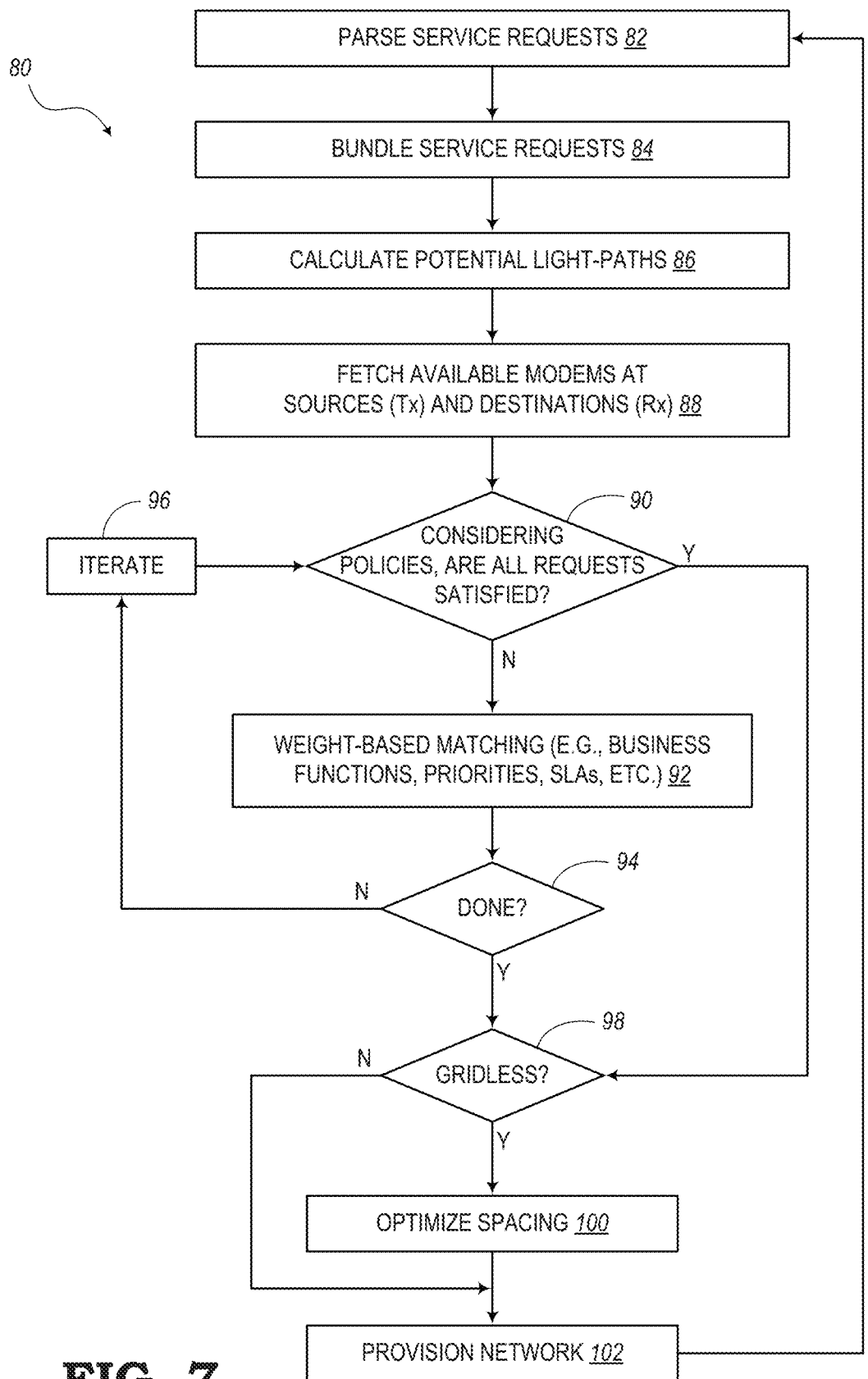
FIG. 7 is a flow diagram illustrating a process for provisioning a network based on service requests and matching pairs of transmitters and receivers at different nodes in the network, according to various embodiments.

FIG. 7 is a flow diagram illustrating an embodiment of a process 80 for provisioning a network based on service requests and matching pairs of transmitters and receivers at different nodes in the network. This may be a high-level example of a process flow. When network restoration (and defragmentation, etc.) is requested for specific routes, de-commissioning the transponders and "re-matching" Tx(s) and Rx(s), more degrees of freedom in the search mechanism can be greatly beneficial to improve customer experience.

As illustrated in this embodiment, the process 80 includes a first step of parsing service requests, as indicated in block 82. The process 80 also includes bundling the service requests as possible, as indicated in block 84. Also, the process 80 includes calculating potential light-paths, such as shortest paths and other possible backup or other types of paths/routes, as indicated in block 86. The process 80 further includes fetching available modems at the source node (for Tx components) and at the destination node (for Rx components), as indicated in block 88.

Furthermore, the process 80 includes determining if all service requests have been satisfied with respect to all the policies to consider, as indicated in decision block 90. If all service requests are satisfied, the process 80 skips ahead to decision block 98. Otherwise, if not all service requests have been fulfilled, the process 80 goes to block 92, which includes the step of executing a weight-based matching step, which may be function of business priorities, user-defined policies, SLAs, etc. Then, it is determined whether or not all the matching functions have been completed, as indicated in decision block 94. If not, the process 80 goes to block 96, which includes iterating the matching procedures and proceeding to decision block 90 to repeat the steps of determining if all requests have been satisfied and matching based on weighted factors.

If it is determined in decision block 94 that the matching is done, the process 80 proceeds to decision block 98, which indicates the step of determining whether or not the optical network includes a gridless framework. If not, the process 80 skips to block 102. If so, the process 80 goes to block 100, which indicates the step of optimizing (or improving) the channel spacing of the spectrum and then proceeding to block 102. Block 102 indicates the step of provisioning the network. In some embodiments, the process 80 may then return back to block 82 to repeat as needed.

Figure 8:
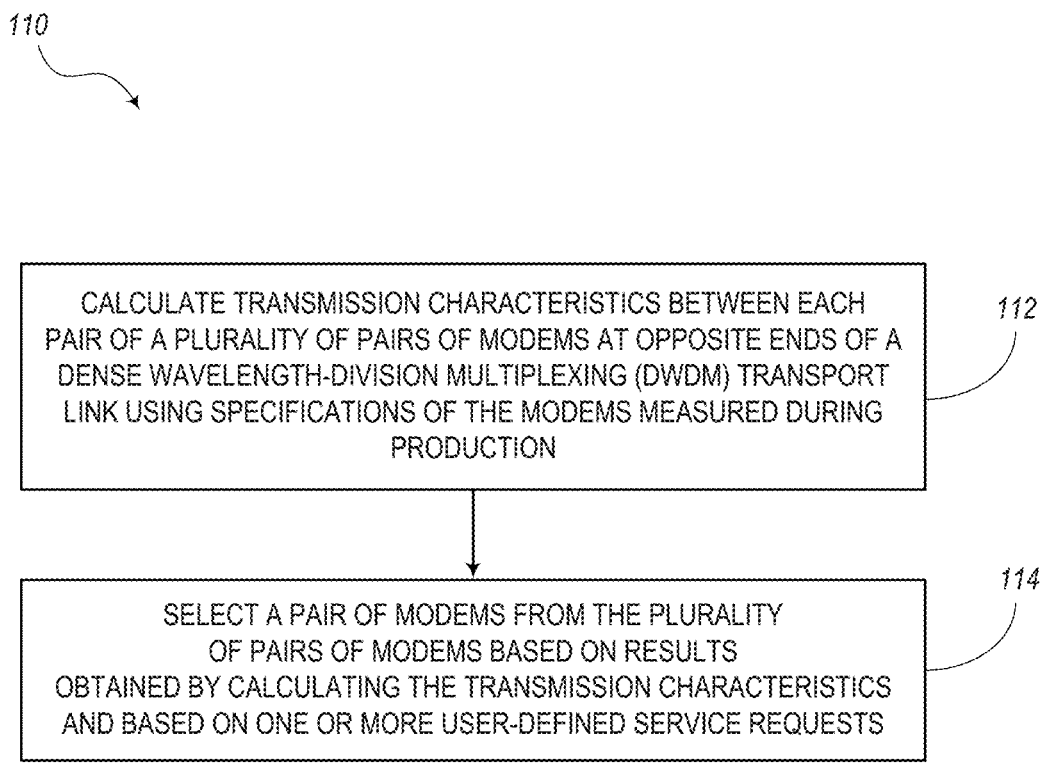
FIG. 8 is a flow diagram illustrating a process for optimally matching pairs of transmitters and receivers in a network, according to various embodiments.

FIG. 8 is a flow diagram illustrating a generalized embodiment of a process 110 for optimally matching pairs of transmitters and receivers in a network. As shown in FIG. 8, the process 110 includes a first step of calculating transmission characteristics between each pair of a plurality of pairs of modems at opposite ends of a Dense Wavelength-Division Multiplexing (DWDM) transport link using specifications of the modems measured during production, as indicated in block 112. The process 110 may also include the step of selecting a pair of modems from the plurality of pairs of modems based on results obtained by calculating the transmission characteristics and based on one or more user-defined service requests, as indicated in block 114.

According to some embodiments, the selecting step (block 114) may be performed in order to make network-level assignments. For example, the network-level assignments may include a) a service assignment, b) detection of an optical Layer 0 restoration path or protection path, c) wavelength assignment or spectrum assignment in an elastic spectrum system, d) path computation, e) defragmentation in a gridless network, f) line rate or Baud rate assignment, and/or other actions. Selecting the pair of modems ay include detecting the interaction of transmitter and receiver components of a first modem at a first node with transmitter and receiver components of a second modem at a second node, the first and second nodes being located on opposite sides of the DWDM transport link.

The DWDM transport link, according to some embodiments, may be a Data Center Interconnect (DCI) link. The step of selecting the pair of modems (block 114) may include the step of considering: a) route selection, b) a number of fiber spans, c) line rates, d) channel spacing, e) operational characteristics, and/or other characteristics or functions. The process 110 in some cases may further include the step of squeezing two channels of an elastic spectrum when a receiver Signal-to-Noise Ratio (SNR) of the two channels meets specific criteria based on associated cross-talk and jitter penalties.

Before calculating the transmission characteristics between each pair of the plurality of pairs of modems, the process 110 may also include the steps of: a) measuring the specifications of transmitter components and receiver components of the modems, and b) populating a modem database with the measured specifications. For example, measuring the specifications of the transmitter components and receiver components of the modems may include the step of generating polynomials to fit the transmitter components and receiver components to model an optical network. The modem database in some cases may include a look-up table.

Each of the plurality of modems described in the process 110 may include one or more transmitter components and one or more receiver components mounted on a modem card. The selected pair of modems may be selected based on a) a network type, b) a number of service requests obtained, c) user-defined policies, d) client priorities, e) Service Level Agreements (SLAs), and/or other criteria. The transmission characteristics described here may include a) Optical Signal-to-Noise Ratio (OSNR) of a transmitter component of a respective modem, b) OSNR of a receiver component of the respective modem, c) intrinsic jitter of the transmitter component, d) intrinsic jitter of the receiver component, and/or other parameters. Each modem may include a Digital-to-Analog Converter (DAC) device and a Phase-Locked Loop (PLL) device. For example, the DAC device may be configured to measure the OSNR of the transmitter component and receiver component. Also, the PLL device, for example, may be configured to measure the intrinsic jitter of the transmitter component and receiver component.

In some embodiments, the process 110 may further comprise the step of calibrating each modem with respect to an ideal modem. The process 110 may also include the steps of 1) obtaining multiple user-defined service requests and 2) matching multiple pairs of modems based on measured transmission characteristics and the specifications measured during production in order to meet the multiple user-defined service requests and to share an optical-traffic load required by the multiple user-defined service requests. Furthermore, the process 110 may include the step of planning multiple matches between pairs of modems, where the multiple matches may be used at different times in the future. Also, selecting the pair of modems may be configured to optimize reach, capacity, and channel spacing in a gridless spectrum network. In addition, selecting the pair of modems may include using a) game theory analysis, b) linear programming, c) heuristics, and/or other techniques.

Figure 9:
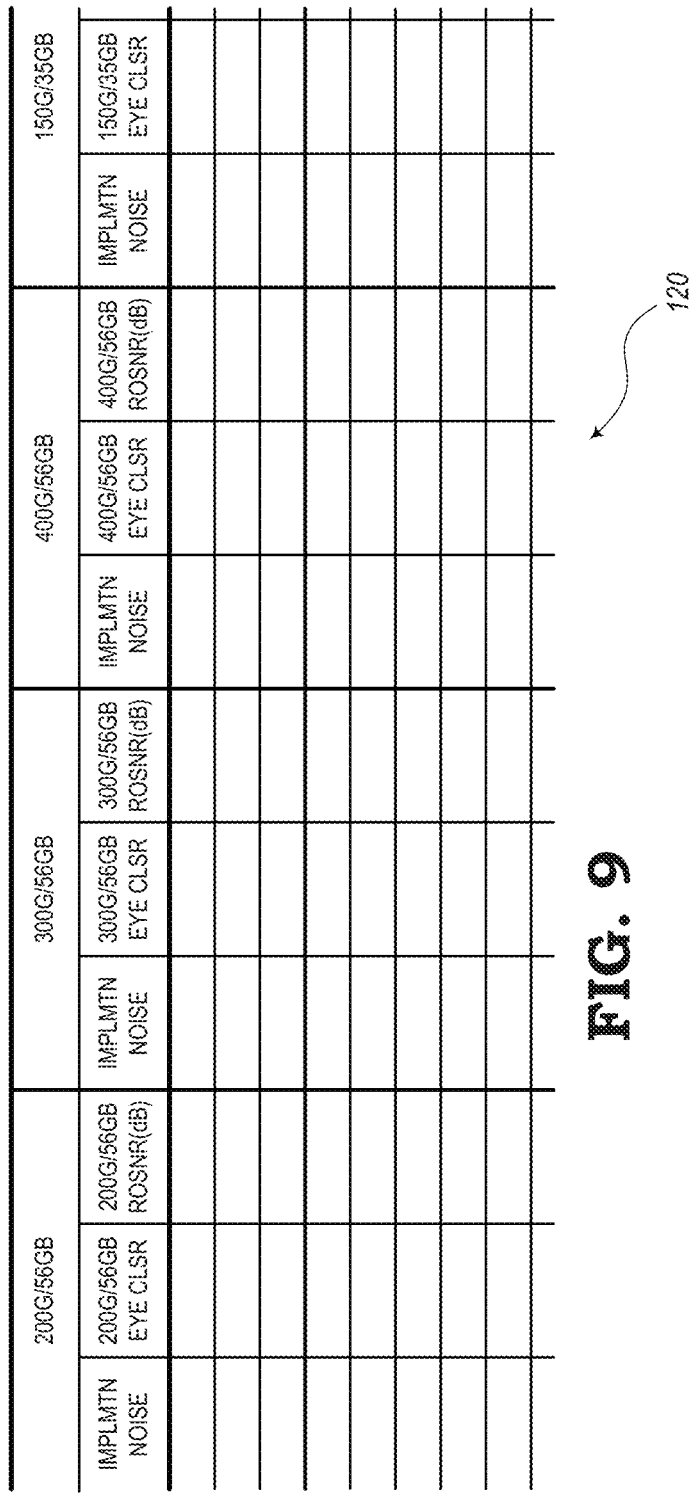
FIG. 9 is a table illustrating an example of transmission characteristics of components that are tested during production, according to various embodiments.

FIG. 9 is a table 120 illustrating an example of transmission characteristics of components that are tested during production. For example, a set of simulations (based on accurate models of some particular modem products and some particular DSP chip products, based on production data, etc.) were conducted to prove the validity of the various embodiments of the present disclosure. The table 120 shows an example of database entries using one card in a loopback arrangement.

For each degree of freedom (e.g., including one or more of capacity, reach, channel spacing, etc.), a set of polynomials were created for matching purposed. These polynomials can then be used in a network assignment (e.g., route modelling analysis). The information may be stored in the modem database 56 and more particularly may be stored in the form of a look-up-table. This example test used 75 nodes in a network along with a realistic traffic matrix. A simulation was run with over 2775 combinations. The granularity of the line-rate is powered by the probabilistic shaping approach. In some respects, it may be noticed that this approach may be similar to the approach described in T. Fehenberger, D. Lavery, R. Maher, A. Alvarado, P. Bayvel, and N. Hanik, "Sensitivity gains by mismatched probabilistic shaping for optical communication systems," http://arxiv.org/abs/1510.03565v2, 2015 and F. Buchali, G. Bocherer, W. Idler, L. Schmalen, P. Schulte, and F. Steiner, "Experimental demonstration of capacity increase and rate-adaptation by probabilistically shaped 64-QAM," in Proc. European Conference and Exhibition on Optical Communication (ECOC), Paper PDP.3.4, September 2015.

As a proof of concept of the embodiments of the present disclosure, testing was performed by creating a service list of 2775 demands, which includes a combination of any-to-any source-destination pairs as a demand. This may be used to validate the following:

1) Average line rate increases per one Network Media Channel/Media Channel (NMC/MC) service for this given network;

2) Average spectrum saving in squeezing n NMC/MC spacing per service for this given network; and 3) Average line rate increases per one NMC/MC service for this given network if an optimal choice of both Tx and Rx transponders is used per service for this given network.

One sample modem is used in the simulation as transponders in the node hardware setups. The stored OSNR variant value is retrieved and used in a novel way to determine routing, modem selection, modulation control, spectrum assignment, etc. using various techniques and algorithms as described herein. The OSNR variant value may be simulated by a normal distribution (Gaussian) function that has $\mu=1$ and $\sigma=0.3$ dB of extra margin than the listed value for this transponder type. For the generated list, the max Tx extra ONSR margin was found to be 2.0369 dB and the max Rx extra ONSR margin was found to be 1.8918.

Figure 10:
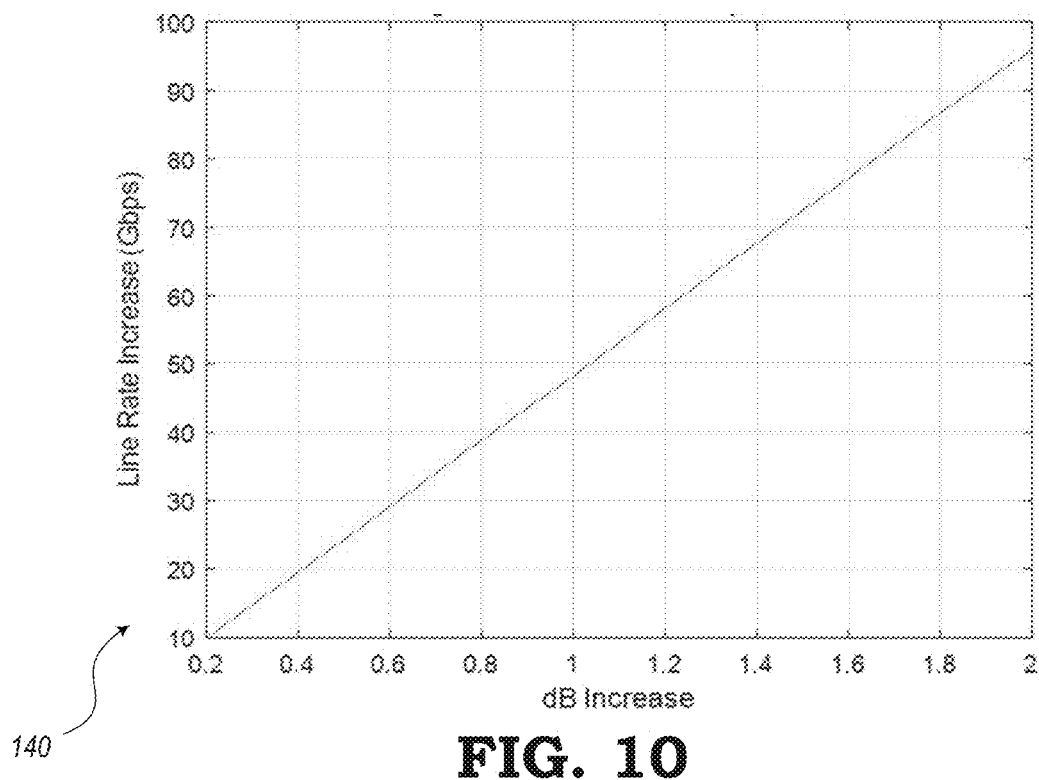
FIG. 10 is a graph illustrating average line rate increase per service, according to various embodiments.

FIG. 10 is a graph 140 illustrating an example of average line rate increase per service. For example, the average line rate may increase per one NMC/MC service for a given network to show an increase with respect to additional OSNR. The test results show extra OSNR margin in both Tx and Rx used to increase the capacity in terms of line rate increase. The graph 140 illustrates the relation between the extra OSNR margin in Tx-Rx pair and the average line rate increase per any service in that given network. This analysis was done, for example, by Monte Carlo simulation methods of 10 different seeds. Each run consisted of the total number of all available any-to-any combination (i.e., 2775 services). On average, it can be seen that this given network experienced an increase of 23.96 GHz of the capacity in terms of line rate increase per any service. Also, the given network was found to have an average spectrum saving in squeezing n NMC/MC spacing per service. That is, the extra OSNR margin in both Tx and Rx was used to decrease the spacing between the NMCs in an assigned MC.

Figure 11:
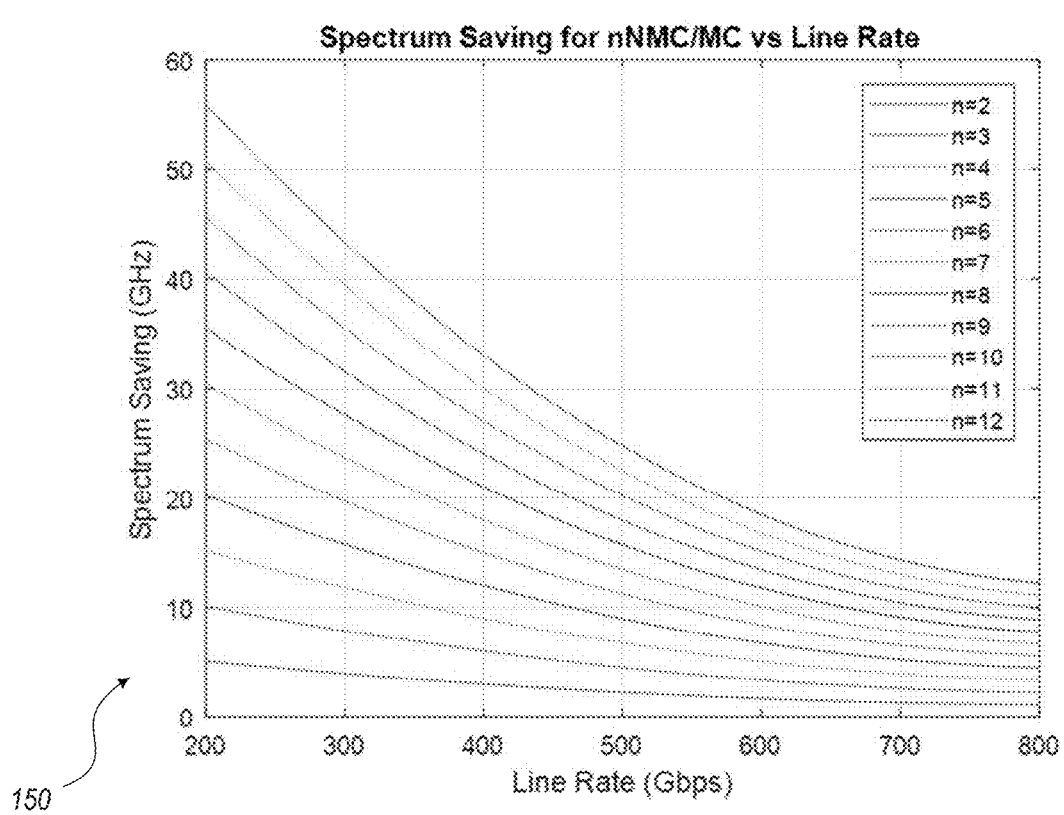
FIG. 11 is a graph illustrating spectrum squeeze savings versus line rate, according to various embodiments.

FIG. 11 is an example of a graph 150 illustrating spectrum squeeze savings versus line rate. The graph 150 shows the relation between the spectrum saving by squeezing the spacing between NMCs for a given MC and the line rate. The number of NMCs are varied from 2 to 12, which is the maximum port number in a specific Multiplexer/Demultiplexer module being tested.

Figure 12:
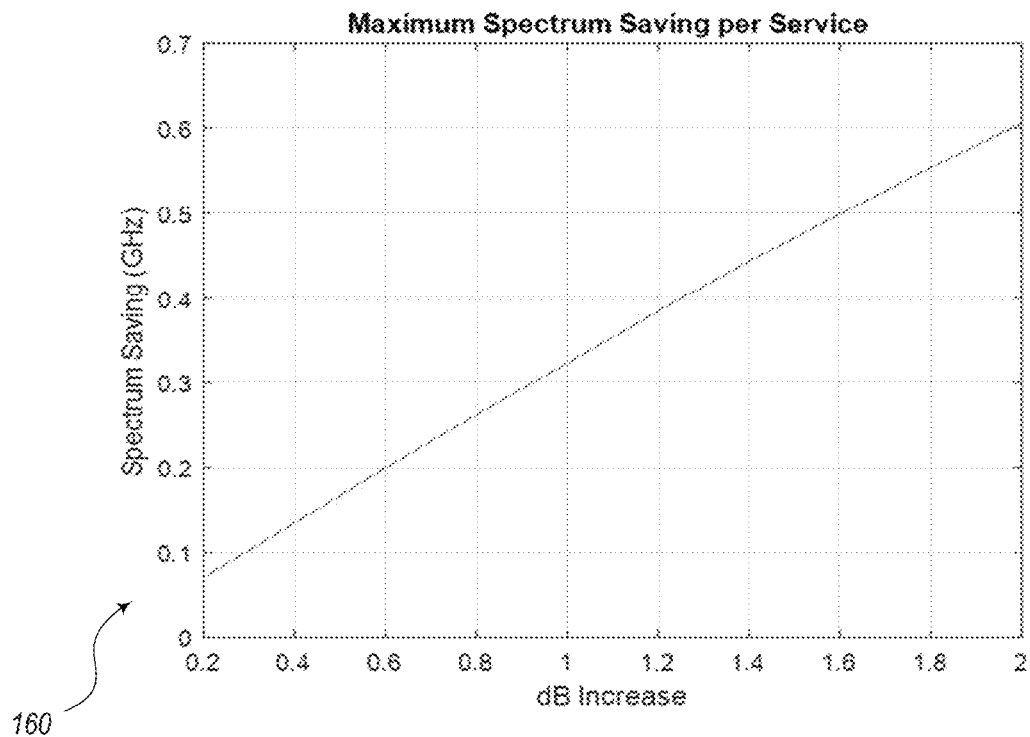
FIG. 12 is a graph illustrating spectrum squeeze savings versus additional OSNR, according to various embodiments.

FIG. 12 is an example of a graph 160 illustrating spectrum squeeze savings versus additional OSNR. The graph 160 illustrates the relation between the spectrum saving by squeezing the separation spaces between NMCs that are used as GBs. This spectrum saving allows more deployment into the network before a blocking stage. This analysis, for example, was also done by Monte Carlo simulation methods of 10 different seeds. Each run consisted of the total number of all available any-to-any combinations (e.g., 2775 services). On average, a decrease of 3.77 GHz in spectrum was obtained per any service for this given network by deploying the methods and processed discussed in the present disclosure.

Average line rate increases per one NMC/MC service for this given network if optimal choice of both Tx and Rx transponder is used per service for this given network. As a result, the produced list of both Tx and Rx extra ONSR margin list had a maximum Tx value of 2.0369 dB, and a maximum Rx value of 1.8918 dB. By randomly making a Tx-Rx pair between the source and destination sites, it could be seen that the given network might get, on average, a maximum of an extra 0.8251 dB margin. The systems and methods of the present disclosure may include procedures or algorithms that can match between the Tx and Rx transponders to use the best-fit couple to optimize the assignment goals. The analysis was done by Monte Carlo simulation methods of 10 different seeds. Each run consisted of a total number of all available any-to-any combination (e.g., 2775 services). On average, the test shows the given network experienced a higher increase of capacity of 27.38 GHz in terms of line rate increase per any service.

Figure 13:
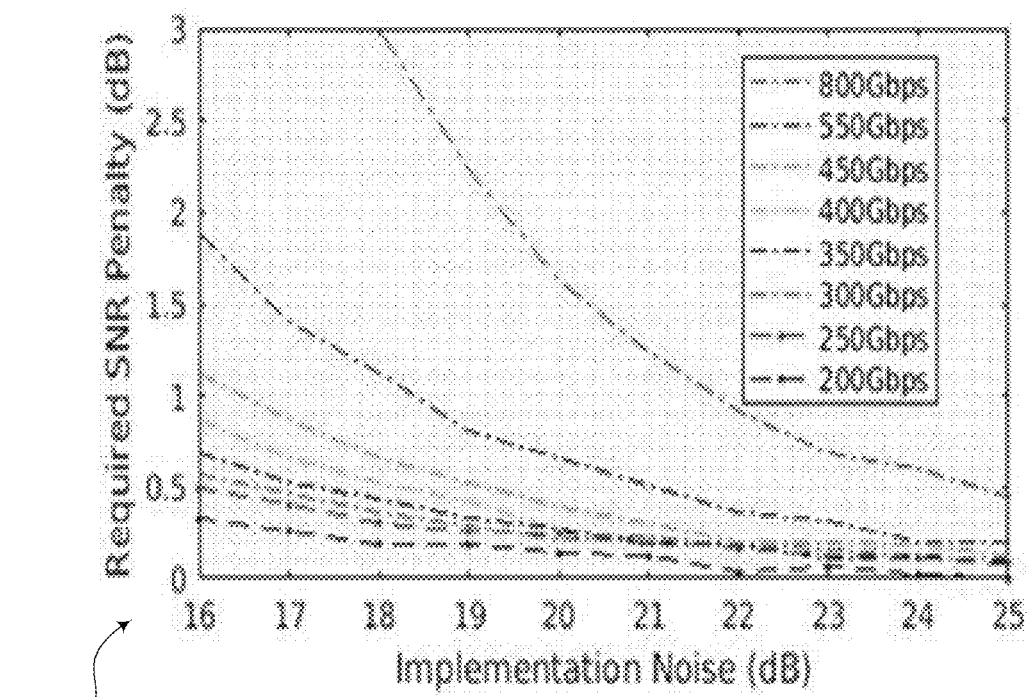
FIG. 13 is a graph illustrating SNR penalty versus implementation noise, according to various embodiments.

FIG. 13 is an example of a graph 170 illustrating SNR penalty versus implementation noise. As illustrated in this graph 170, the impact of implementation noise was investigated. That is, implementation noise included different implementation SNRs under the assumption of additive white Gaussian noise and the resulting impact on the performance of various line rates. The results were compared to a floating point implementation of the transponder. It may be observed that as Amplified Spontaneous Emission (ASE) rises, implementation noise creates less of an impact. Therefore, Space-Division Multiplexing (SDM) may allow for less stringent implementation noise. It may also be seen that for a high-throughput transceiver (e.g., 800 Gbps in Data Center Interconnect (DCI) links), the sensitivity to implementation noise is significant.

Therefore, the systems and methods of the present disclosure may provide network assignment functionality for determining routing, modem (e.g., transmitter, receiver) selection, modulation configuring, spectrum assignment, and other functions. Thus, in addition to the benefits described throughout the present disclosure, in summary, the following benefits may be obtained as well. For example, the present embodiments may be configured to extend the cognitive-level of routing-related algorithms by taking advantage of the "big data" concept to increase the efficiency of multi-layer network solutions. As described with respect to the above-mentioned simulations, the embodiments may be configured to exploit Tx/Rx information of multiple cards as part of network planning activities (e.g., routing, restoration, defragmentation, etc.). This provides an advantage, for example, of better usage of network equipment. Also, from a marketing perspective, it may be understood that the embodiments of the present embodiment will likely result in an increase in the Return on Investment (ROI) per capital spent for network equipment. Also, the present disclosure is configured to offer customers more options to automate their networks and activate more services, which can especially be advantageous when enabling new services by reducing the amount of stress on network engineers, network operators, technicians, etc. from both sides.

One goal of the various embodiments of the present disclosure may be to maximize capacity by matching Tx and Rx components based on the condition of the link. These processed may be performed in order to either maximize capacity, maximize the reach, and/or improve the operation of the deployment. In some cases, suppose a network includes two cards providing 800 Gbps Ethernet. A network technician may install the equipment described herein in the present disclosure in a network infrastructure and may want, on one channel, 800G Ethernet, but he may not want to mate two services with two 400 Gbps to get 800 Gbps. In this situation, the techniques of the present disclosure may be configured to search for two transponders that, in consideration of the link condition, can get 800G Ethernet when those two transponders are used. However, if these were randomly selected, the network at this link may reach 700 Gbps, for example, and not the 800 Gbps as requested. If the two components are selected carefully, based on the data stored during production, then it may be determined that these two may be acceptable and may be selected.

The present embodiments match the modems. The production data can be put into the transmitter and receiver components that describe their respective performance during production to allow a technician to utilize the various components in whatever way he may want to use them. The network manager or technician may be given various options with respect to route selection, reach, line rate (e.g., Baud rate), channel spacing, operations, etc. Thus, the systems and methods may be configured to basically exploit how the modems may be used. Essentially, this information may be tested from the components (e.g., card) during the manufacturing process and then stored for use after the components are deployed in the network. In a liquid spectrum environment, where channel width is adjustable, this information can be utilized for optimizing channel (NMC) assignment within the spectrum (MC). The information is stored while the components (e.g., transponder cards) are tested at the factory. In particular, the information can be utilized to performing matching of a particular transmitter on one side (e.g., source side) of a link with a particular receiver on the other side (e.g., destination side) of the link. These are matched to meet various service requests or requirements. It may be noted that conventional liquid spectrum techniques do not offer this type of matching described in the present disclosure. In the above example, a request for 800 Gbps may be made and the systems and methods of the present disclosure are configured to go and find the transmitters and receivers that can support this request.

Each transponder, transceiver, modem, etc. will store its production data on it. The system will then automatically pick a couple of devices to form a match in order to support whatever requirements may be needed in the network. The total SNR that the receiver sees is governed by Eq. 1 described above. The transponder or modem may have a transmitter and receiver. Each one may also have its own noise parameters and/or its own deliverable SNR. The functions of the present disclosure are configured to break down the component and decide on a selection based on $1/SNR_{cross-talk}$, taking into consideration other parts of the equation, in order to decide on the acceptable pair.

Essentially, each card is going to provide data to the SDN controller 40 about what it can do. When a service request is received (e.g., a request for 800 Gbps), the SDN controller 40 is configured to select a Tx/Rx pair based on the data in the associated database (e.g., modem database 56). The SNR data (and other data) can be obtained from the transmitter devices and receiver devices themselves, which can be plugged into Eq. 1 described above.

To show the importance of such data, the graph 170 of FIG. 14 shows the ROSNR penalty vs implementation noise, where the required SNR, especially as the line rate is higher (from 800G all the way to 200G), it can be seen that the Data Center Interconnect (DCI) link can get 800 Gbps services. Any changes in the selection of the modems can make a significant difference about whether the same service will be enabled or not. For example, even just one dB in the implementation noise can make a significant difference in the total SNR, and hence the total impairment that can be handled on the link. In addition to DCI links, the embodiments of the present disclosure may also be applied to submarine cable (e.g., Marea).

For example, the present embodiments may be applicable with other types of fiber optic cables (e.g., hollow fiber, etc.). In this case, it can have less non-linearity, less losses, less latency, etc. All modems in the network, regardless of fiber type, may be able to get higher capacity, so they can use the implementation noise to improve the total capacity. Thus, the embodiments are directed to selecting modems based on their factory calibration data and based on required services.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a processing device, and
a memory device configured to store a computer program having instructions that, when executed, enable the processing device to
calculate transmission characteristics between each pair of a plurality of pairs of modems at opposite ends of a Dense Wavelength-Division Multiplexing (DWDM) transport link using specifications of the modems measured during production, and
select a pair of modems from the plurality of pairs of modems based on results obtained by calculating the transmission characteristics and based on one or more user-defined service requests,
wherein the pair of modems are selected based on reach that includes a length of a fiber span between the pair of modems, capacity that is determined by a line rate of the pair of modems, and channel spacing in a gridless spectrum network where the channel spacing determines how close adjacent channels are in the gridless spectrum network, wherein the pair of modems provide optical transmission therebetween.

2. The system of claim 1, wherein selecting the pair of modems is performed in order to make network-level assignments, the network-level assignments including one or more of:
a service assignment,
detection of an optical Layer 0 restoration path or protection path,
wavelength assignment or spectrum assignment in an elastic spectrum system, path computation,
defragmentation in a gridless network, and
line rate or Baud rate assignment.

3. The system of claim 1, wherein selecting the pair of modems includes detecting the interaction of transmitter and receiver components of a first modem at a first node with transmitter and receiver components of a second modem at a second node, and wherein the first and second nodes are located on opposite sides of the DWDM transport link.

4. The system of claim 1, wherein the DWDM transport link is any of a Data Center Interconnect (DCI) link, a metro link, a regional link, a long haul link, and a submarine link.

5. The system of claim 1, wherein selecting the pair of modems includes considering one or more of route selection, number of fiber spans, line rates, channel spacing, and operational characteristics.

6. The system of claim 1, wherein, before calculating the transmission characteristics between each pair of the plurality of pairs of modems, the instructions further enable the processing device to:
measure the specifications of transmitter components and receiver components of the modems, and
populate a modem database with the measured specifications.

7. The system of claim 6, wherein measuring the specifications of the transmitter components and receiver components of the modems includes generating polynomials to fit the transmitter components and receiver components to model an optical network.

8. The system of claim 6, wherein the modem database includes a look-up table.

9. The system of claim 1, wherein each of the plurality of modems includes one or more transmitter components and one or more receiver components mounted on a modem card.

10. The system of claim 1, wherein the selected pair of modems is selected based on one or more of a network type, a number of service requests obtained, user-defined policies, client priorities, and Service Level Agreements (SLAs).

11. The system of claim 1, wherein the transmission characteristics include one or more of Signal-to-Noise Ratio (SNR) of a transmitter component of a respective modem, SNR of a receiver component of the respective modem, intrinsic jitter of the transmitter component, and intrinsic jitter of the receiver component.

12. The system of claim 1, wherein each modem includes a Digital-to-Analog Converter (DAC) device and a Phase-Locked Loop (PLL) device.

13. The system of claim 1, wherein the instructions further enable the processing device to:
obtain multiple user-defined service requests; and
match multiple pairs of modems based on measured transmission characteristics and the specifications measured during production in order to meet the multiple user-defined service requests and to share an optical-traffic load required by the multiple user-defined service requests.

14. The system of claim 1, wherein the instructions further enable the processing device to plan multiple matches between pairs of modems, and wherein the multiple matches are configured for use at different times in the future.

15. The system of claim 1, wherein selecting the pair of modems includes using one or more of game theory analysis, linear programming, and heuristics.

16. A system comprising:
a processing device, and
a memory device configured to store a computer program having instructions that, when executed, enable the processing device to
calculate transmission characteristics between each pair of a plurality of pairs of modems at opposite ends of a Dense Wavelength-Division Multiplexing (DWDM) transport link using specifications of the modems measured during production,
select a pair of modems from the plurality of pairs of modems based on results obtained by calculating the transmission characteristics and based on one or more user-defined service requests, and
insert a channel associated with the selected pair of modems into an elastic spectrum when a receiver Signal-to-Noise Ratio (SNR) at the pair of modems meets specific criteria based on associated cross-talk and jitter penalties.

17. The system of claim 16, wherein selecting the pair of modems includes detecting the interaction of transmitter and receiver components of a first modem at a first node with transmitter and receiver components of a second modem at a second node, and wherein the first and second nodes are located on opposite sides of the DWDM transport link.

18. A system comprising:
a processing device, and
a memory device configured to store a computer program having instructions that, when executed, enable the processing device to
calculate transmission characteristics between each pair of a plurality of pairs of modems at opposite ends of a Dense Wavelength-Division Multiplexing (DWDM) transport link using specifications of the modems measured during production,
select a pair of modems from the plurality of pairs of modems based on results obtained by calculating the transmission characteristics and based on one or more user-defined service requests,
wherein the specifications of transmitter components and receiver components of the modems are measured in the production and populated in a modem database, including generating polynomials to fit the transmitter components and receiver components to model an optical network.

19. The system of claim 18, wherein the modem database includes a look-up table.

* * * * *